United States Patent
Kariyappa et al.

(10) Patent No.: US 12,401,598 B2
(45) Date of Patent: Aug. 26, 2025

(54) APPLICATION ACCELERATION ON CLOUD NETWORKS

(71) Applicant: Cisco Technology, Inc., San Jose, CA (US)

(72) Inventors: Ramakumara Kariyappa, San Jose, CA (US); Satish Mahadevan, San Ramon, CA (US); Biju Mathews Mammen, Mountain House, CA (US); Balaji Sundararajan, Fremont, CA (US); Giorgio Valentini, Walnut Creek, CA (US); Venkatraman Venkatapathy, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 264 days.

(21) Appl. No.: 18/052,826

(22) Filed: Nov. 4, 2022

(65) Prior Publication Data

US 2024/0073147 A1  Feb. 29, 2024

Related U.S. Application Data

(60) Provisional application No. 63/400,114, filed on Aug. 23, 2022.

(51) Int. Cl.
*H04L 47/2441* (2022.01)
*H04L 45/85* (2022.01)
*H04L 47/2425* (2022.01)

(52) U.S. Cl.
CPC .......... *H04L 47/2441* (2013.01); *H04L 45/85* (2022.05); *H04L 47/2433* (2013.01)

(58) Field of Classification Search
None
See application file for complete search history.

(56) References Cited

U.S. PATENT DOCUMENTS

| | | | |
|---|---|---|---|
| 10,630,508 B2 * | 4/2020 | Wang | H04L 12/4633 |
| 10,715,419 B1 * | 7/2020 | Suryanarayana | H04L 12/4641 |
| 11,412,051 B1 * | 8/2022 | Chiganmi | H04L 41/0895 |
| 2016/0020969 A1 * | 1/2016 | Vasseur | H04L 43/062 370/252 |

(Continued)

OTHER PUBLICATIONS

"Cisco SD-WAN Design Guide", retrieved from https://web.archive.org/web/20210806133945if_/https://www.cisco.com/c/en/us/td/docs/solutions/CVD/SDWAN/cisco-sdwan-design-guide.pdf, Sep. 30, 2020, pp. 41-42.

(Continued)

*Primary Examiner* — Ranodhi Serrao
(74) *Attorney, Agent, or Firm* — Lee & Hayes, P.C.

(57) ABSTRACT

Techniques are described for routing traffic through an interconnect cloud gateway based on cloud traffic routing indicators. The interconnect cloud gateway can advertise the cloud traffic routing indicators, which can include cloud indicators and transport gateway indicators. The cloud indicators can include cloud tags utilized to route cloud traffic. The transport gateway indicators can include transport gateway flags utilized to identify private networks utilized to route the cloud traffic. The cloud traffic can routed during normal private network operation through private networks, which can be dynamically replaced by public networks due to occurrences of failures preventing the data traffic from being routed through the private networks and to cloud networks.

21 Claims, 5 Drawing Sheets

(56) References Cited

U.S. PATENT DOCUMENTS

| | | | |
|---|---|---|---|
| 2017/0078410 A1* | 3/2017 | Rao | H04L 41/5025 |
| 2018/0227969 A1* | 8/2018 | Verkaik | H04W 8/082 |
| 2019/0132152 A1* | 5/2019 | Wang | H04L 12/4645 |
| 2019/0141015 A1* | 5/2019 | Nellen | H04L 63/0272 |
| 2019/0158605 A1* | 5/2019 | Markuze | H04L 69/163 |
| 2019/0268421 A1* | 8/2019 | Markuze | H04L 67/10 |
| 2020/0028758 A1* | 1/2020 | Tollet | H04L 45/02 |
| 2020/0244486 A1* | 7/2020 | Wang | H04L 12/4633 |
| 2020/0344163 A1* | 10/2020 | Gupta | H04L 45/70 |
| 2020/0412608 A1* | 12/2020 | Dunbar | H04L 45/50 |
| 2021/0058284 A1* | 2/2021 | Chandramohan | H04L 45/586 |
| 2022/0012091 A1* | 1/2022 | Shil | G06F 9/485 |
| 2022/0159059 A1* | 5/2022 | Abhigyan | H04L 67/51 |
| 2023/0164059 A1* | 5/2023 | Dawani | H04L 45/02 |
| | | | 370/392 |
| 2024/0048530 A1* | 2/2024 | Shevade | H04L 43/08 |

OTHER PUBLICATIONS

PCT Search Report and Written Opinion mailed Nov. 20, 2023 for PCT Application No. PCT/US2023/072163, 21 pages.

Johal, "Virtual Private Gateways Association to Direct Connect Gateway in AWS", AWS Community Builders Blog, retrieved at https://dev.to/aws-builders/associate-virtual-private-gateways-to-direct-connect-gateways-in-aws-8n2, Aug. 2021, 7 pgs.

Tschopp, "Cloud Security with Software-Defined Cloud Interconnect"; Swisscom; retrieved Sep. 2022 at https://www.swisscom.ch/en/about/career/getit/tech-hub/cloud-security-with-software-defined-cloud-interconnect.html, 5 pgs.

* cited by examiner

CLOUD TRAFFIC ROUTING INDICATORS
302

CLOUD INDICATOR
304

TRANSPORT GATEWAY INDICATOR
306

PRIVATE NETWORK FAILURE INDICATOR
308

FIG. 3

APPLICATION ACCELERATION ON CLOUD NETWORKS

RELATED APPLICATIONS

This application claims benefit of priority to U.S. Provisional Patent Application Ser. No. 63/400,114, filed on Aug. 23, 2022, which is incorporated by reference herein in its entirety.

TECHNICAL FIELD

The present disclosure relates generally to utilizing cloud and transport gateway identifiers to direct application traffic through high speed network paths.

BACKGROUND

Networks managing cloud-based data traffic often include various types of networks and network devices responsible for transporting individual data packets. The network devices may be utilized to route the data traffic from branch devices and to cloud devices. The data traffic may be routed utilizing networks of different types according to instructions from the branch devices. The different types of networks may include public networks utilized to route the data traffic through the internet, as well as private networks, such as proprietary service guaranteed networks.

The branch devices may generate instructions utilized to identify preferred networks through which the data traffic may be routed. To accomplish this type of prioritization within the networks, the branch devices may utilize information associated with the different types of networks. The prioritization information may include network utilization costs and predetermined customer agreements. In some cases, the branch devices may be configured to select networks based on jitter, loss, and latency. Public networks may be associated with relatively lower costs compared to the private networks, as well as being associated with nonexistent or limited predetermined customer agreements. Utilizing private networks often requires performance of complex configurations. However, as amounts of data traffic and cloud utilization grow, customer interest in leveraging the private networks for cloud data communication continues to become increasingly important.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates an example of cloud traffic routing indicators.

DESCRIPTION OF EXAMPLE EMBODIMENTS

Overview

Figure 1:
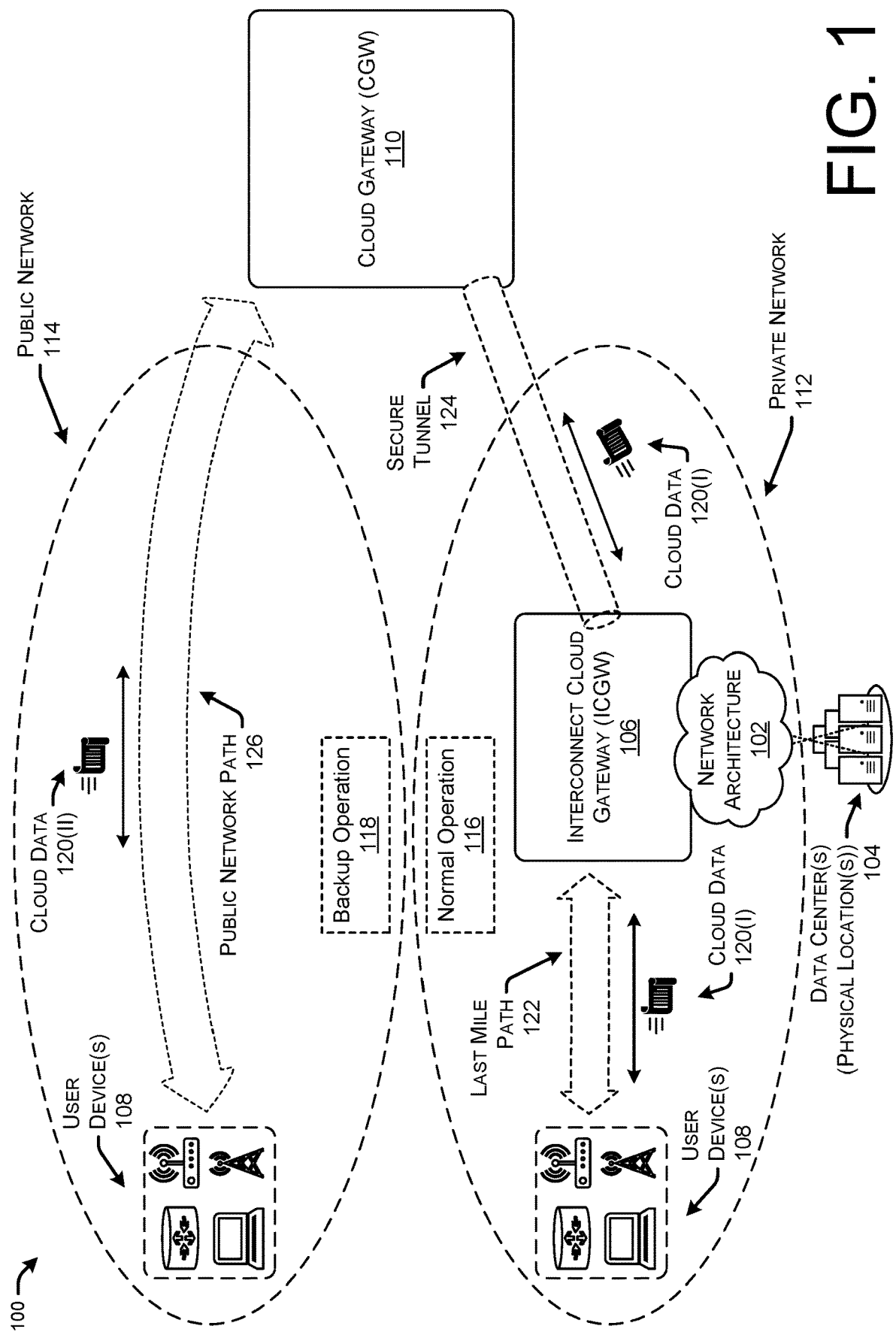
FIG. 1 illustrates an example topology of a network architecture for routing cloud data according to a normal operation utilizing an interconnect cloud gateway (ICGW), and a backup operation not utilizing the ICGW, based on cloud traffic routing indicators.

This disclosure describes techniques for directing data traffic through interconnect gateways based on characteristics associated with cloud networks and private networks. An example method includes identifying a cloud tag and a transport gateway flag. The cloud tag can be utilized to route cloud bound data. The transport gateway flag can identify, based on advertisement of the cloud tag, a private network as having a priority that is greater than or equal to a priority of a non-private network. The cloud tag and the transport gateway flag can be utilized to direct the cloud bound data toward the private network. The cloud bound data can be routed through the private network and to a cloud network. Based on a failure of the private network or another network utilized to route the cloud bound data through the private network, the cloud bound data can be routed through the public network and to the cloud network.

The cloud tag, which can be utilized to direct cloud bound data, can be routed to a branch network, via various networks. The cloud tag can be advertised by the cloud network and to the private network. The private network can advertise the cloud tag to the branch network. The branch network can utilize the cloud tag advertised by the cloud network and the private network to direct the cloud bound data. A cloud bound data prefix utilized to route the cloud bound data may be tagged with the cloud tag. The cloud bound data can be routed to the cloud network based on the prefix associated with the cloud bound data being identified as being tagged by the cloud tag. Non-cloud bound data can be routed to a non-cloud network based on a non-cloud bound data prefix associated with the non-cloud bound data not being identified as not being tagged by the cloud tag. The cloud network can be identified as a destination to which the cloud bound data is to be routed based on a presence of the cloud tag. The non-cloud network can be identified as a destination to which the non-cloud bound data is to be routed based on an absence of the cloud tag.

The transport gateway flag can be utilized based on the cloud tag being advertised to direct user data identified as the cloud bound data through the private network. The transport gateway flag, which can be enabled by the private network, can be utilized by the branch network to identify the private network, and route the cloud bound data toward the private network, the private network being identified from among various networks including the public network and the private network. The non-cloud bound data can be routed by the branch network and toward the public network notwithstanding the transport gateway flag being enabled, based on the destination of the non-cloud bound data being the non-cloud network.

The private network can be identified and utilized by the branch network to route the user data based on the user data being the cloud bound data. The cloud bound data can be routed through the private network based on the cloud bound data prefix associated with the cloud bound data being tagged by the cloud tag, and the transport gateway flag being enabled. The non-cloud bound data can be routed through the network other than the private network based on the non-cloud bound data prefix associated with the non-cloud based data not being tagged by the cloud tag.

The private network can be identified from among the private network and the public network and utilized to route the cloud bound data based on a mode associated with routing of the cloud-bound data utilizing the private network being a normal operation (e.g., a normal mode). The branch network can utilize the public network, which can include a direct path between the branch network and the cloud network, to route the cloud bound data based on the mode associated with routing of the cloud-bound data utilizing the private network being a failure operation (e.g., a failure mode). The public network can be utilized to route the cloud bound data to the cloud network based on the failure mode being associated with the failure of the private network or the other network utilized to route the cloud bound data through the private network.

Additionally, the techniques described herein may be performed by a system and/or device having non-transitory computer-readable media storing computer-executable instructions that, when executed by one or more processors, performs the method described above.

Implementations of the present disclosure solve specific problems in the field of computer networking. For example, devices in branch networks can utilized cloud tags and transport gateway flags to route cloud data traffic through private networks without requiring performance of complex configurations. The cloud tags and the transport gateway flags being utilized to identify the private networks as default networks for transmission of the cloud data traffic can conserve compute resources that would otherwise have been exhausted according to existing techniques. The conservation of the compute resources can enable the compute resources to be reallocated and utilized for other purposes. The cloud data traffic being efficiently routed through the private networks can conserve network resources, including resources in the public networks and other non-private networks. The conserved network resources can improve performance of the public networks and the other non-private networks in contrast to existing techniques.

By configuring the branch networks to automatically switch to the public networks as backups for routing the cloud data traffic due to a failure in the private networks or other networks utilized to route the cloud data traffic through the private networks, the cloud data traffic can be delivered to the cloud networks with minimal delay. Automatically utilizing the public networks as backups can include the branch networks dynamically redirecting the cloud data traffic to the public networks to avoid private network failures of the cloud data traffic. By utilizing the public networks based on occurrences of the private network failures, blackholing of the cloud data traffic which would otherwise occur according to existing techniques can be eliminated.

Various implementations of the present disclosure will be described in detail with reference to the drawings, wherein like reference numerals present like parts and assemblies throughout the several views. Additionally, any samples set forth in this specification are not intended to be limiting and merely demonstrate some of the many possible implementations.

Example Embodiments

This disclosure describes techniques for routing traffic through an interconnect cloud gateway (ICGW) based on cloud traffic routing indicators. The ICGW can advertise the cloud traffic routing indicators, which can include cloud indicators and transport gateway indicators. The cloud indicators can include cloud tags utilized to route cloud traffic. The transport gateway indicators can include transport gateway flags utilized to identify priorities of private networks utilized to route the cloud traffic. The cloud traffic can be automatically routed during normal private network operation through private networks (e.g., networks including the ICGW), which can be dynamically replaced by public networks (e.g., networks not including the ICGW) due to occurrences of failures preventing the data traffic from being routed through the private networks and to cloud networks. The ICGW can be operated as a transport gateway during the normal operation.

In examples, the cloud tags can be utilized by the branch networks, which can include branch devices to route the cloud traffic. The cloud tags, which can be utilized to tag prefixes, can be advertised to the branch devices utilizing the prefixes to route the cloud traffic. The branch devices being utilized to route the cloud traffic can be configured to direct the cloud traffic through the private networks based on the prefixes being tagged by the cloud tags. The branch devices can be configured to direct other types of traffic, including branch-to-branch traffic, through other networks, including the public networks. The other traffic, including the branch-to-branch traffic, which can be associated with other prefixes, can be routed through the other networks, including the public networks, based on the other prefixes not being tagged by the cloud tags.

In examples, the private networks, which can include ICGWs, can be utilized to route the cloud traffic from the branch devices and to the cloud networks. The ICGWs can be utilized to advertise the prefixes, which can be tagged by the cloud tags, to the branch devices. The prefixes being tagged by the cloud tags can be advertised to, and utilized by, the branch devices to direct cloud traffic toward the ICGWs. The ICGWs being configured to operate as transport devices can route the cloud traffic to the cloud networks.

In examples, the cloud networks can include cloud gateways (CGWs) utilized to route traffic, including the cloud traffic, received from networks, including the private networks. The CGWs can be utilized to route the cloud traffic received from the ICGWs. The cloud traffic received from the ICGWs can be routed by the CGWs, which can enable various types of cloud resources, including workloads and applications of various types. The workloads and applications enabled by the CGWs can be accessed with less latency than in systems according to existing technology that utilize public networks as defaults for branch devices directing cloud traffic.

In examples, the CGWs can receive the cloud traffic through public networks based on the branch devices identifying failures associated with routing of the cloud traffic through the ICGWs and to the CGWs. Various types of failures utilized to route the cloud traffic through the public networks as backup networks can include device failures and network failures. The device failures can be associated with the ICGWs. The network failures can be associated with routing of cloud traffic between the ICGWs and other devices, including the CGWs.

Examples described herein are directed to specific technical improvements in the field of computer networking. Using various architectures and signaling described herein, a network can efficiently route cloud traffic utilizing an ICGW identified by a branch device for routing the cloud traffic based on a cloud tag and a transport gateway flag. The branch device can switch to directing the cloud traffic through a public network based on a failure associated with routing the cloud traffic through the ICGW and to a CGW. Unlike previous techniques, implementations of the present disclosure prevent delays in routing cloud traffic to CGWs that often experience high levels of congestion due to other cloud traffic or traffic of other types. Accordingly, various implementations described herein are directed to specific practical applications in the field of computer networking.

Certain implementations and embodiments of the disclosure will now be described more fully below with reference to the accompanying figures, wherein like reference numerals present like parts and assemblies throughout the several views. However, the various aspects may be implemented in many different forms and should not be construed as limited to the implementations set forth herein.

FIG. 1 illustrates an example topology of an environment 100 for routing cloud data according to a normal operation utilizing an interconnect cloud gateway (ICGW), and a backup operation not utilizing the ICGW, based on cloud traffic routing indicators. The environment 100 can include a network architecture 102, which can include one or more distributed devices, which may be housed in one or more data centers 104. One or more of the distributed device(s) of the network architecture 102 can be utilized as an interconnect cloud gateway (ICGW) 106. The environment 100 can include one or more user devices 108, which can include various types of devices, including, but not limited to, computers, mobile devices, internet of things (IOT) devices, cameras, microphones, and/or any other user devices. The environment 100 can include a cloud gateway (CGW) 110, which can be utilized by the user device(s) 108 to access one or more clouds. By way of example, the CGW 110 can be utilized to access one or more applications (or "cloud application(s)") and/or one or more services (or "cloud service(s)") in the cloud(s).

The user device(s) 108 can exchange communications with one another, the ICGW 106, and/or the CGW 110, via one or more networks. The user device(s) 108 can utilize one or more networks, including a private network 112 and/or a public network 114 to communicate with the CGW 110. In some examples, the user device(s) 108 can utilize the private network 112, which can include the ICGW 106, to communicate with the CGW 110 according to a normal operation (or "normal mode") 116 associated with the ICGW 106 and/or one or more of the network(s) utilized for communications exchanged between the user device(s) 108 and the CGW 110. In those or other examples, the user device(s) 108 can utilize the public network 114 to communicate with the CGW 110 according to a backup operation (or "backup mode") 118 associated with the ICGW 106 and/or one or more of the network(s) utilized for communications exchanged between the user device(s) 108 and the CGW 110. The cloud data being transmitted and/or received by the client device(s) 108 can include cloud data 120(I) and 120(II) (collectively "120"), the cloud data 120(I) being communicated during for the normal operation 116 and cloud data 120(II) being communicated during the backup operation 118.

Although the cloud data 120(I) being communicated during for the normal operation 116 and cloud data 120(II) being communicated during the backup operation 118, as discussed above in the current disclosure, it is not limited as such. In some examples, a portion (e.g., an entire portion or a partial portion) the cloud data 120(I) can be the same as, or different from a portion (e.g., an entire portion or a partial portion) the cloud data 120(II).

The user device(s) 108 can utilize the private network 112 based on the normal operation 116 as a normal mode (e.g., a default mode) (or "default") for transmission and/or reception of the cloud data 120(I). The normal operation 116 can be associated with satisfactory operation of one or more devices (e.g., network device(s)) and one or more networks associated with the private network 112. The normal operation 116 can be based on an absence of failures, such as one or more network failures and/or one or more router failures. The failure(s) can include one or more failures and/or one or more interruptions associated with the ICGW 106, the CGW 110, one or more of the network(s) to which the ICGW 106 is connected, one or more of the network(s) to which the CGW 110 is connected, and/or any combination thereof.

In some examples, the normal operation 116 can be based on an absence of the failure(s) and the interruption(s). The failure(s) can include one or more failures of the ICGW 106 and/or one or more of the device(s) (e.g., router(s)) of the ICGW 106, one or more failures of a path between the ICGW 106 and the CGW 110, etc. The interruption(s) can include incomplete routing of the cloud data 120(I) (e.g., current cloud data and/or previous cloud data) between the ICGW 106 and the CGW 110. The interruption(s) can include one or more failures of one or more of the network(s) (e.g., one or more paths of the network(s)) utilized for routing (or "transmitting") (or "sending") (or "transporting") the cloud data 120(I) through the ICGW 106 and to the CGW 110. In some examples, the failure(s) can include a portion (e.g., an entire portion or a partial portion) of the cloud data not being successfully routed to the CGW 110.

The user device(s) 108 can utilize the public network 114 based on the backup operation 118 as a backup mode (or "backup") for transmission and/or reception of the cloud data 120(II). The backup operation 118 can be associated with unsatisfactory operation of one or more devices and one or more networks associated with the private network 112. The normal operation 116 can be based on an absence of failures, such as one or more network failures and/or one or more device (e.g., router) failures. The failure(s) can include one or more of the failure(s) and/or one or more of the interruption(s) associated with the ICGW 106, the CGW 110, one or more of the network(s) to which the ICGW 106 is connected, one or more of the network(s) to which the CGW 110 is connected, and/or any combination thereof.

Although the failure(s) can include a failure of the ICGW 106 and/or one or more devices (e.g., router(s)) of the ICGW 106, and the interruption(s) can include incomplete routing of the cloud data 120(I) between the ICGW 106 and the CGW 110, as discussed above in the current disclosure, it is not limited as such. The terms "failure(s)" and "interruptions(s)" are utilized for convenience and simplicity of explanation and can be interpreted as being interchangeable with one another according to any of the techniques discussed herein.

Although the failure(s) can include the portion of the cloud data not being successfully routed to the CGW 110, as discussed above in the current disclosure, it is not limited as such. In alternative or additional examples, the failure(s) and/or the interruption(s) can include one or more levels of loss, latency, jitter, path failures, and so on, and/or any combination thereof, being equal to or greater than one or more threshold levels. In those or other examples, for instance with a level of latency being equal to or greater than a threshold level of latency, the normal operation 116 can be stopped and the backup operation 118 can begin. The portion of the cloud data 120(I) not successfully routed, as well as one or more other portions of the cloud data 120(I) and/or one or more other portions (e.g., entire portion(s) and/or partial portion(s)) of other cloud data, can be routed via the public network 114 utilizing the backup operation 118. Upon restoration of one or more sources and/or causes of the failure(s), the backup operation 118 can be stopped and the normal operation 116 can begin again and/or resume. The portion of the cloud data 120(I) not successfully routed, as well as one or more other portions of the cloud data 120(I) and/or one or more other portions (e.g., entire portion(s) and/or partial portion(s)) of other cloud data (e.g., the cloud data 120(II)), can be routed via the private network 112 based on the normal operation 116 beginning and/or resuming.

The user device(s) 108 can transmit and/or receive the cloud data 120(I) according to the normal operation 116 by utilizing one or more of the network(s) (e.g., one or more portions and/or one or more of the device(s) of the network(s), one or more of the path(s) of the network(s), one or more tunnels, such as one or more secure tunnels, and so on), which can include a last mile path 122 and a secure tunnel 124. The last mile path 122, which can be included in the private network 112 for routing the cloud data 120(I) between the user device(s) 108 and the ICGW 106, can include a path (e.g., a last mile) (e.g., the indirect path 208, as discussed in further detail below with reference to FIG. 2) between a branch network and the ICGW 106. The branch network can include one or more branch routers (e.g., the branch router(s) 204) utilized to route the cloud data 120(I) between the user device(s) 108 and the CGW 110.

Although the secure tunnel 124 can be utilized to transport cloud data 120(I), as discussed above in the current disclosure, it is not limited as such. In some examples, the secure tunnel 124 can include one or more paths of various types between the ICGW 106 and the CGW 110, the path(s) between the ICGW 106 and the CGW 110 including one or more service level agreement (SLA) guaranteed paths (or "SLA path(s)"), one or more paths via one or more SLA guaranteed routers (e.g., one or more of the ICGW router(s) as discussed in further detail below with reference to FIG. 2) (or "SLA path(s)"). In some examples, one or more other paths and/or other routers of various types (e.g., non-SLA path(s) and/or non-SLA router(s)) can be utilized in a similar way as for the secure tunnel 124 to implement any of the techniques discussed herein.

The user device(s) 108 can transmit and/or receive the cloud data 120(II) according to the backup operation 118 by utilizing one or more of the network(s) (e.g., one or more portions and/or one or more of the device(s) of the network(s), one or more of the path(s) of the network(s), one or more tunnels, such as one or more secure tunnels, and so on), which can include a public network path 126. The public network path 126, which can be included in the public network 114 for routing the cloud data 120(II) between the user device(s) 108 and the ICGW 106, can include a direct path between the branch router(s) and the CGW 110. In some examples, the direct path can include a path that excludes the ICGW 106. In those or other examples, the direct path can include one or more other devices of various types (e.g., switches, routers, and/or other network devices in any network topology). The public network path 126 can include a path over a public internet utilized to access the applications(s) and/or the service(s) in the cloud(s).

The private network 112 according to the normal operation 116 can be utilized to route the cloud data (e.g., the cloud data 120(I)) more efficiently, securely, and/or reliably than the public network 114 according to the backup operation 118. Instead of identifying the public network path 126 as the default based on the public network path 126 being the direct path, the user device(s) 108 can utilized an indirect path, including the last mile path 122 and the secure tunnel 124, via the ICGW 106, to route the cloud data 120(I), based on capabilities of the private network 112 being greater than or equal to capabilities of the public network 114. In some examples, the indirect path can include a path that includes the ICGW 106. In those or other examples, the indirect path can include one or more other devices of various types (e.g., switches, routers, and/or other network devices in any network topology).

In some examples, one or more characteristics of the private network 112 (e.g., characteristic(s) of the secure tunnel 124), can include relatively lower latency, relatively lower jitter, relatively lower lag, relatively greater failure prevention, relatively greater reliability, and/or relatively higher bandwidth in comparison to one or more characteristics of one or more portions of the public network 114 (e.g., characteristic(s) of one or more public network paths, such as one or more portions the public network path 126). The characteristic(s) of the private network 112, such as the characteristic(s) of the secure tunnel, can be based on the secure tunnel 124 being a dedicated path (e.g., one or more dedicated fiber-optic channels) (or "dedicated fiber").

Although the network(s) (e.g., the private network 112, the public network 114, etc.) in the environment 100 can include the network device(s), as discussed above in the current disclosure, it is not limited as such. In some examples, the network device(s) can include physical or virtual switches, routers, and other network devices in any network topology, including multi-tier (e.g., core, distribution, and access tiers), spine-and-leaf, mesh, tree, bus, hub and spoke, and so on.

Figure 2:
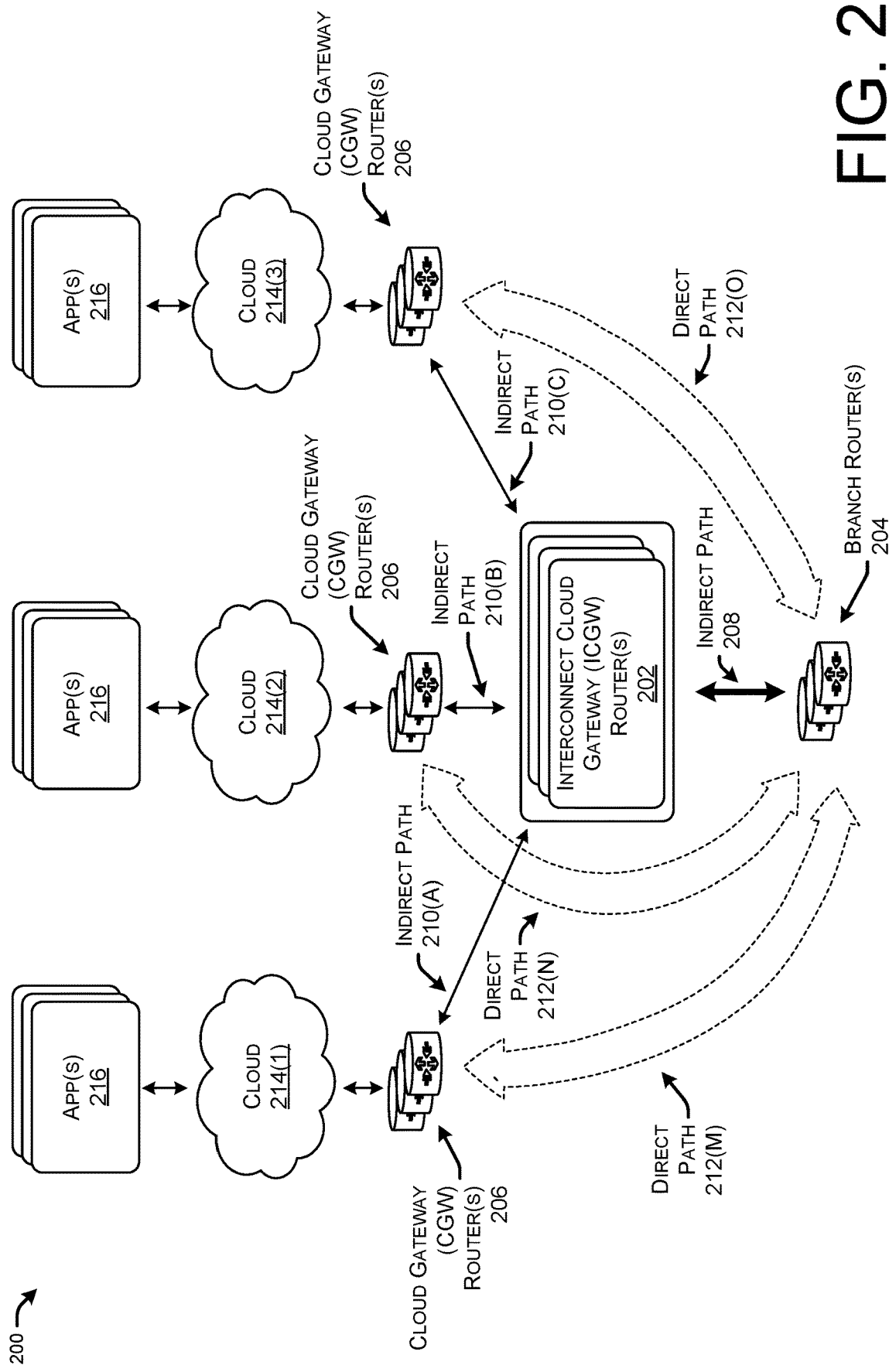
FIG. 2 illustrates an example topology of a network architecture for utilizing cloud traffic routing indicators to transport cloud data from branch router(s) and through interconnect cloud gateway (ICGW) router(s).

FIG. 2 illustrates an example topology of a network architecture 200 for utilizing cloud traffic routing indicators to transport cloud data from branch router(s) and through interconnect cloud gateway (ICGW) router(s). The network architecture 200 can include one or more interconnect cloud gateway (ICGW) routers 202. The ICGW router(s) 202 can be included in one or more ICGWs (e.g., the ICGW 106, as discussed above with reference to FIG. 1). The network architecture 200 can include one or more branch routers 204. The branch router(s) 204 can be utilized to exchange communications associated with the cloud data between one or more user devices (e.g., the user device(s) 108, as discussed above with reference to FIG. 1) and the ICGW 106 via the ICGW router(s) 202. The network architecture 200 can include one or more cloud gateway (CGW) routers 206 (e.g., router(s) associated with one or more virtual private clouds (VPCs) and/or being utilized for communications exchanged between one or more VPC devices). The CGW routers 206 can be included in one or more CGWs (e.g., the CGW 110, as discussed above with reference to FIG. 1).

In some examples the branch router(s) 204 can be included in one or more networks (e.g., software-defined wide area network(s) (SD-WAN(s))) of various types. In those or other examples, the branch router(s) 204 can be included in the network(s) (e.g., the SD-WAN(s)) along with one or more other devices (e.g., router(s)), the branch router(s) 204 being included in network(s) (e.g., the SD-WAN(s)) with one or more other routers in the branch router(s) 204 and/or with one or more of the other device(s). In those or other examples, any other device(s) (e.g., router(s)) exchanging communications with the branch router(s) 204 can be included in the same or different network(s) (e.g., the SD-WAN(s)) that include one or more of the branch router(s) 204.

Cloud data related communications between the user device(s) 108 and the CGW 110 via the ICGW router(s) 202 can be exchanged utilizing the branch router(s) 204, via an indirect path (or "first indirect path") (or "transport gateway path") 208. In some examples, the indirect path 208 can be a last mile between the branch router(s) 204 and the ICGW router(s) 202. In those or other examples, the indirect path 208 can be integrated with, or utilized in combination with, the last mile path 122, as discussed above with reference to FIG. 1. In those or other examples, the indirect path 208 can be implemented as the last mile path 122 being utilized to exchange communications between the user device(s) 108 and the CGW 110 via the branch router(s) 204 and via the ICGW router(s) 202.

Communications associated with the cloud data can be exchanged between the user device(s) 108 and the CGW 110 via the ICGW router(s) 202 by utilizing the branch router(s) 204, via the indirect path 208 and one or more indirect paths (or "second indirect path(s)") (or "transport gateway path(s)") 210(A), 210(B), and/or 210(C) (collectively "210"). One or more indirect paths, which can include the indirect path 208 and/or one or more of the indirect path(s) 210, can be utilized by the user device(s) 108 to exchange the cloud data related communications with the CGW 110 (e.g., the cloud router(s) 206 in the CGW 110) according to a normal operation (e.g., the normal operation 116, as discussed above with reference to FIG. 1).

In some examples, the indirect path(s) 210 can include one or more paths between one or more of the ICGW router(s) 202 and one or more of the CGW router(s) 206. In those or other examples, the indirect path(s) 210 can include one or more private network paths, such as one or more paths including one or more secure tunnels) (e.g., the secure tunnel 124) in the private network (e.g., the private network 112). In those or other examples, the indirect path(s) 210, which can be utilized to exchange communications associated with the cloud data between the user device(s) 108 and the CGW 110 via the branch router(s) 204 and via the ICGW router(s) 202, can be integrated with, or utilized in combination with, the indirect path 208. In those or other examples, for instance with the indirect path 208 being implemented as one or more indirect paths, the indirect path(s) 210 can be integrated with, or utilized in combination with, the indirect path(s) 208, and/or a respective group of indirect paths (e.g., one or more indirect paths) of the indirect path(s) 208.

Communications associated with the cloud data between the user device(s) 108 and the CGW 110 can be exchanged utilizing the branch router(s) 204, via one or more direct paths 212(M), 212(N), and/or 212(O) (collectively "212"). The cloud data related communications can include the direct path(s) 212, which do not include the ICGW 106 and/or the ICGW router(s) 202. One or more of the direct paths 212 can be utilized by the user device(s) 108 to exchange the cloud data related communications with the CGW 110 (e.g., the cloud router(s) 206 in the CGW 110) according to a backup operation (e.g., the backup operation 118, as discussed above with reference to FIG. 1).

Determining to exchange communications associated with the cloud data utilizing one or more indirect paths (e.g., the indirect path 208 and/or the indirect path(s) 210) via the private network 112, or one or more direct paths (e.g., the direct path(s) 212) via the public network 114, can be based on one or more of the cloud traffic routing indicators (e.g., one or more of the cloud traffic routing indicators 302, as discussed in further detail below with reference to FIG. 3). Cloud bound traffic (or "cloud traffic") can be routed based on the branch router(s) 204 identifying traffic as being the cloud traffic and determining to route the cloud traffic based on the cloud traffic routing indicators 302. The cloud traffic routing indicator(s) can include one or more cloud indicators (e.g., the cloud indicator (e.g., the cloud tag) 304, as discussed in further detail below with reference to FIG. 3), one or more transport gateway indicators (e.g., the transport gateway indicator 306, as discussed in further detail below with reference to FIG. 3) (e.g., the transport gateway flag), and/or one or more private network failure indicators (e.g., the private network failure indicator 308, as discussed in further detail below with reference to FIG. 3).

In some examples, determining to exchange communications associated with the cloud data can be based on the prefixes in the branch router(s) 204 being tagged by the cloud tag. In those or other examples, determining to exchange communications associated with the cloud data utilizing one or more indirect paths (e.g., the indirect path 208 and/or the indirect path(s) 210) (e.g., transport gateway path(s)) via the private network 112, can be based on the cloud tag being identified, and based on the transport gateway flag being enabled to identify, generate, and/or modify a priority associated with the indirect path(s) as being greater than or equal to a priority associated with the direct path(s) 212. The cloud tag can be identified based on the cloud tag being advertised by the CGW 110, and via the ICGW 106 and/or one or more ICGW related paths (e.g., private network path(s)), and based on the ICGW 106 and/or the ICGW related paths being advertised. The cloud data can be exchanged via the indirect path(s) by utilizing the ICGW 106 as a transport gateway. In some examples, determining to exchange communications associated with the cloud data utilizing the indirect path(s) can be include the branch router(s) 204 refraining from selecting the direct path(s) (e.g., the non-ICGW related path(s)).

In some examples, determining to exchange communications associated with cloud data utilizing one or more direct paths can be based on the prefixes in the branch router(s) 204. In those or other examples, determining to exchange communications associated with the cloud data utilizing the direct path(s) (e.g., the direct path(s) 212) (e.g., non-transport gateway paths(s)) via the public network 114, can be based on the cloud tag, the ICGW 106, and/or one or more ICGW related paths (e.g., private network path(s), not being advertised, and/or based on the indirect path(s) (e.g., the indirect path 208 and/or the indirect path(s) 210) having been withdrawn. In those or other examples, determining to exchange communications associated with the cloud data utilizing the direct path(s) can be include the branch router(s) 204 refraining from selecting the ICGW 106 and/or the indirect path(s) (e.g., the ICGW related path(s)). The ICGW 106 and/or the ICGW related paths not being advertised can be identified based on absence of identification of the cloud tag, identifying an absence of the cloud tag, identifying withdrawal of the cloud tag, and so on. The ICGW 106 not being advertised and/or the indirect path(s) having been withdrawn can be utilized to prevent the branch router(s) 204 from identifying the cloud tag and/or one or more relatively greater priorities of the indirect route(s). The branch router(s) 204 not identifying advertising of the ICGW 106, and/or not identifying the relatively greater priority(ies) of the indirect route(s), can be utilized to route, via the direct path(s) 212, the cloud data as a result of one or more failures, as discussed above with reference to FIG. 1. In some examples, the ICGW 106 can modify, re-route, re-generate, and/or re-originate, based on the ICGW 106 not being advertised and/or the indirect path(s) having been withdrawn, one or more routes utilized to direct the cloud traffic via the direct path(s) 212 instead of the indirect path 208 and/or the indirect path(s) 210.

Communications associated with the cloud data exchanged between the user device(s) 108 and the CGW 110 (e.g., the CGW router(s) 206 in the CGW 110) can be utilized by the user device(s) 108 to access one or more applications and/or one or more services in one or more cloud networks (or "cloud(s)") 214(1), 214(2), and/or 214(3) (collectively "214"). The application(s) and/or the service(s) can be accessed in the cloud(s) 214 according to the normal operation 116 via the first indirect path 208 and/or the second indirect path(s) 210, and/or according to the backup operation 118 via the direct path(s) 212.

By utilizing the indirect path(s) (e.g., the first indirect path 208 and/or the second indirect path(s) 210), the user device(s) 108 can access the cloud application(s) and/or the cloud service(s) more efficiently, securely, and/or reliably than by utilizing the direct path(s) 212. The cloud application(s) and/or the cloud service(s) can be accessed relatively more efficiently, securely, and/or reliably based on the indirect path(s) 210 including one or more secure tunnel(s) between one or more of the ICGE router(s) 202 and one or more of the CGW router(s) 206. The secure tunnel(s) can include guaranteed access (e.g., one or more guaranteed maximum accessibility levels, one or more guaranteed maximum latency levels, one or more guaranteed maximum packet loss levels, and so on) to the cloud application(s) and/or the cloud service(s). The secure tunnel(s), which can be included in the private network 112, can be identified, generated, and/or managed by one or more service providers associated with the ICGW 106, one or more of the ICGW router(s) 202, and/or the private network 112.

In some examples, the private network 112, the indirect path 208, the indirect path(s) 210, and/or the ICGW router(s) 202 can be utilized by the user device(s) 108 and/or the branch router(s) 204 based on one or more contracts, one or more agreements, etc., associated with one or more users of the user device(s) 108. However, the current disclosure is not limited as such. In those or other examples, the private network 112, the indirect path 208, the indirect path(s) 210, and/or the ICGW router(s) 202 can be utilized by the user device(s) 108 and/or the branch router(s) 204 based on any information allocated by the service provider(s) for providing access to, and/or determining how to provide access to, the private network 112, the indirect path 208, the indirect path(s) 210 and/or the ICGW router(s) 202.

In some examples, communications associated with non-cloud data (e.g., branch-to-branch data, etc.) can be exchanged utilizing one or more paths (e.g., direct path(s)) between one or more of the branch router(s) 204 and one or more other routers (e.g., one or more of the branch router(s) 204, one or more other branch routers, etc.). The non-cloud traffic can be routed based on the branch router(s) 204 identifying traffic as being the non-cloud traffic, which can be based on one or more prefixes (e.g., non-cloud prefixes) of the non-cloud traffic not being tagged with one or more cloud tags. The non-cloud traffic can be received by the branch router(s) 204 from one or more devices (e.g., the user device(s) 108, one or more other devices, etc.) of various types. The non-cloud traffic can be routed by identifying the path(s) included in one or more non-ICGW related paths and determining to utilize the non-ICGW related paths to route the non-cloud traffic. The non-ICGW related paths can include the path(s) that do not include the ICGW 106 and/or the ICGW router(s) 202.

As a hypothetical example, managing application acceleration on cloud networks can include identifying a cloud indicator (e.g., the cloud indicator 304) utilized to route cloud bound data; enabling a transport gateway flag (e.g., the transport gateway indicator 306); identifying a transport gateway path (e.g., the indirect path 208) as having a higher priority than a non-transport gateway path (e.g., the direct path 212); receiving, from a branch router 204, user data in the cloud bound data based on the cloud tag, the transport gateway flag, and a branch router setting, the branch router selecting the transport gateway path based on the transport gateway flag and the branch router setting; and transmitting the user data to a cloud device (e.g., a device in a cloud 214) via a cloud gateway router 206. At least one of the cloud tag or the transport gateway flag can be identified by the branch router 204 via an advertisement. Receiving the user data can include receiving the user data based on the branch router 204 selecting the transport gateway path from among the transport gateway path and the non-transport gateway path, the branch router refraining from selecting the non-transport gateway path based on the transport gateway flag being enabled. A prefix of the branch router can include the cloud tag utilized by the branch router to route the cloud bound data to an interconnect gateway 106. Managing the application acceleration on the cloud networks can include disabling the transport gateway flag based on a failure of a path between an interconnect gateway 106 and a cloud gateway 110. Managing the application acceleration on the cloud networks can include disabling the transport gateway flag based on a failure of an interconnect gateway router 202. Managing the application acceleration on the cloud networks (e.g., the clouds 214) can include disabling the transport gateway flag based on a failure of an interconnect gateway 106 or a path between an interconnect gateway 106 and a cloud gateway 110, the branch router transmitting second user data to the cloud device via a direct connection between the branch router 204 and the cloud gateway 110 based on the transport gateway flag being disabled.

As another hypothetical example, managing application acceleration on cloud networks can include identifying a cloud tag (e.g., the cloud indicator 304) utilized to route cloud bound data (e.g., the cloud data 120); enabling a transport gateway flag (e.g., the transport gateway indicator 306) identifying a transport gateway path (e.g., the indirect path 208) as having a higher priority than a non-transport gateway path (e.g., the direct path 212); receiving, from a branch router, user data in the cloud bound data based on the cloud tag, the transport gateway flag, and a branch router setting, the branch router selecting the transport gateway path based on the transport gateway flag and the branch router setting; and transmitting the user data to a cloud device via a cloud gateway router. The identifying of the cloud tag, the enabling of the transport gateway flag, the receiving of the user data, and the transmitting of the user data can be performed at least partly by a network device (e.g., the ICGW router(s) 202).

As another hypothetical example, managing application acceleration on cloud networks can include identifying a cloud tag (e.g., the cloud indicator 304) utilized to route cloud bound data (e.g., the cloud data 120); identifying a transport gateway flag (e.g., the transport gateway indicator 306) and identifying a transport gateway path as having a higher priority than a non-transport gateway path; and routing data traffic toward i) an interconnect gateway 106 based on the transport gateway flag being enabled and a private network failure not being identified, or ii) a public network based on the private network failure being identified. The identifying of the cloud tag, the identifying of the transport gateway flag, the identifying of the transport gateway path as having the higher priority than the non-transport gateway path, and/or the routing of the data traffic can be performed by a branch router 204. At least one of the cloud tag or the transport gateway flag is identified by the branch router 204 via an advertisement. routing the data traffic further comprises routing the data traffic through a transport gateway path from among the transport gateway path and the non-transport gateway path. Managing the application acceleration on the cloud networks refraining from selecting the non-transport gateway path based on the transport gateway flag being enabled. A prefix of a branch router 204 includes the cloud tag utilized by the branch router 204 to route the cloud bound data to an interconnect gateway 106. Routing the data traffic further comprises routing the data traffic through the public network based on the private network failure being identified, the transport gateway flag being disabled based on a failure of a path between the interconnect gateway 106 and a cloud gateway 110. Routing the data traffic further comprises routing the data traffic through the public network based on the private network failure being identified, the transport gateway flag being disabled based on a failure of an interconnect gateway router 202.

In some examples, utilizing one or more branch-to-branch routes (e.g., direct route(s)) for branch-to-branch traffic results in the branch-to-branch traffic avoiding a "hop" via the ICGW 106 (e.g., by removing "hair pinning" via the ICGW 106). The branch-to-branch route(s) can be utilized for the branch-to-branch traffic based on non-cloud prefixes of the branch-to-branch traffic not including one or more cloud prefix tags.

Although advertising by the CGW 110 and to the branch router(s) 204 can include advertising the cloud tag, as discussed above in the current disclosure, it is not limited as such. Advertising, which can include advertising, by the CGW 110 and to the branch router(s) 204, the cloud tag, the transport gateway flag, an ICGW identifier associated with an ICGW (e.g., the ICGW 106), and/or one or more ICGW related path identifiers associated with one or more ICGW related paths, can be utilized in a similar way as the advertising of the cloud tag by the CGW 110 and to the branch router(s) 204 to implement any of the techniques as discussed herein. By including tagging logic only in the CGW 110, one or more identifiers (e.g., the cloud tag, the transport gateway flag, the ICGW 106, and/or one or more of the ICGW related path(s)) can be carried to one or more devices (e.g., the ICGW 106, one or more re-originated routes to and/or from the ICGW 106, one or more CGW routers (or "edge routers"), etc.). Information, including the identifier(s), which can be advertised to, and/or available locally in, the edge router(s), can be utilized by the edge router(s) to make one or more best-path decisions to prefer the ICGW 106 and/or the ICGW related path(s) based on the cloud prefix(es) (e.g., only for cloud prefixes). Because the tagging logic can be omitted from the ICGW 106, flexibility for configuring routing via the ICGW 106 and/or the ICGW related path(s) can be increased and/or ensured.

Although advertising by the CGW 110 and to the branch router(s) 204 can include advertising the cloud tag, as discussed above in the current disclosure, it is not limited as such. Advertising, which can include, alternatively or additionally to the advertising by the CGW 110, advertising, by the ICGW 106 and to the branch router(s) 204, one or more identifiers (e.g., one or more of the CGW advertised identifier(s) advertised by, and/or received from, the ICGW 106, and/or one or more ICGW identified and/or generated identifiers (e.g., one or more identifiers similar to, and/or different from, the CGW identifier(s))), can be utilized in a similar way as the advertising of the cloud tag by the CGW 110 and to the branch router(s) 204 to implement any of the techniques as discussed herein. In some examples, a portion (e.g., a partial portion or an entire portion) of tagging logic being similar to, and/or different from, the tagging logic included in the CGW 110 can be included in the ICGW 106.

FIG. 3 illustrates an example of cloud traffic routing indicators 302. One or more of the cloud traffic routing indicators 302 can be utilized to determine to exchange communications associated with cloud data. The communications associated with the cloud data can be exchanged based on the cloud traffic routing indicators 302 by utilizing one or more indirect paths (e.g., the indirect path 208 and/or the indirect path(s) 210, as discussed above with reference to FIG. 2) via a private network (e.g., the private network 112, as discussed above with reference to FIG. 1), or one or more direct paths (e.g., the direct path(s) 212, as discussed above with reference to FIG. 2) via a public network (e.g., the public network 114, as discussed above with reference to FIG. 1). The cloud traffic routing indicators 302 can be stored via the ICGW 106 as one or more ICGW settings. In some examples, one or more of the cloud traffic routing indicators 302 can be identified as one or more advertisements from the ICGW 106 and to the branch router(s) 204.

The cloud traffic routing indicators 302 can include a cloud indicator 304 and a transport gateway indicator 306. The cloud indicator 304 can include a cloud tag. The transport gateway indicator 306 can include a transport gateway flag. One or more cloud tags, which can be advertised to one or more branch devices (e.g., one or more of the branch router(s) 204, as discussed above with reference to FIG. 2), can be utilized to tag one or more prefixes (e.g., prefixes according with cloud data). The tag(s), and/or the prefix(es) being tagged via the cloud tag as one or more tagged prefixes, can be utilized to route cloud traffic between one or more user devices (e.g., one or more of the user device(s) 108) and one or more clouds (e.g., one or more of the cloud(s) 214) for accessing one or more applications (or "apps") 216 (e.g., one or more applications and/or one or more services) associated with the cloud(s) 214.

By way of example, for instance with the cloud traffic being associated with a cloud of a first type (e.g., the cloud 214(1), which can be associated with a service provider (or "first service provider")), a cloud tag and/or a prefix being tagged as a cloud tagged prefix, can be utilized to route traffic to the cloud 214(1), based on the traffic being identified as cloud traffic. By way of another example, for instance with non-cloud traffic not being associated with a cloud, a prefix not being tagged as a cloud tagged prefix can be utilized to route traffic to a non-cloud destination, based on the traffic not being identified as cloud traffic.

One or more transport gateway flags can be utilized to determine to route traffic utilizing the ICGW router(s) 202, based on the traffic being identified as cloud traffic. In some examples, the transport gateway flag(s) can be utilized to route traffic between one or more of the user device(s) 108 and one or more of the cloud(s) 214, via the branch router(s) 204, one or more of the ICGW router(s) 202, and one or more of the CGW router(s) 206, based on the traffic being cloud traffic, for accessing one or more of the application(s) 216 (e.g., one or more applications and/or one or more services) associated with the cloud 214(1).

By way of example, for instance with the cloud traffic being associated with a cloud of a first type (e.g., the cloud 214(1), which can be associated with a service provider (or "first service provider)), the cloud indicator 304 (e.g., the cloud tag) and/or the tagged prefix can be utilized, along with the transport gateway flag, to route traffic to the cloud 214(1), via the ICGW router(s) 202 and the CGW router(s) 206, based on the traffic being identified as cloud traffic. A transport gateway path (e.g., the indirect path 208, any of the indirect path(s) 210, or a combination thereof) can be identified as having a priority that is greater than or equal to a priority of a non-transport gateway path (e.g., any of the direct path(s) 212), based a transport gateway flag being enabled. Although the tag and/or the tagged prefix can be utilized, along with the transport gateway flag, to route the cloud traffic, as discussed above in the current application, it is not limited as such. In some examples, the transport gateway flag, individually or in combination with the tag and/or the tagged prefix, can be utilized to route the cloud traffic via the ICGW router(s) 202 and the CGW router(s) 206.

In some examples, utilization of the transport gateway indicator 306 (e.g., the transport gateway flag) can include configuration of one or more the branch router(s) 204. In those or other examples, one or more of the branch router(s) 204 can be configured utilizing a one line configuration, one line configuration being utilized to instruct the branch router(s) 204 to route the cloud traffic through the ICGW router(s) 202 and to the cloud(s) 214, via the CGW router(s) 206. By way of example, the line configuration can be based on a tag (e.g., a tag utilized to route cloud traffic via the ICGW 106) being identified and/or generated in one or more of the cloud(s) 214, the tag being communicated by the cloud(s) 214 and to the CGW 110 (e.g., one or more of the CGW router(s) 206, the tag being advertised by the CGW 110 and to the branch router(s) 204, via the ICGW 106.

Although the transport gateway indicator 306 can be utilized based on the advertised cloud indicator 304 to route the cloud data via the transport gateway path or the non-transport gateway path, as discussed above in the current disclosure, it is not limited as such, In some examples, the one line configuration can be utilized in a similar way as for the transport gateway indicator 306 to route the cloud data in a similar way as for the transport gateway indicator 306, to implement any of the techniques discussed herein.

Although the cloud indicator 304 (e.g., the cloud tag) can be advertised to the branch router(s) 204, as discussed above in the current disclosure, it is not limited as such. In some examples, the cloud indicator 304 (e.g., the cloud tag) can be advertised in various ways, such as by an overlay management protocol (OMP) signal. In those or other examples, one or more OMP signals, which can be exchanged between the CGW 110, the ICGW 106, and/or the branch router(s) 204, can be utilized to advertise the cloud indicator 304 (e.g., the cloud tag) by the CGW 110 and to the branch router(s) 204, via the ICGW 106.

Although the one line configuration can be utilized to control the branch router(s) 204 to route the cloud traffic, as discussed above in the current disclosure, it is not limited as such. One or more configurations (e.g., a one line configuration, a two line configuration, a three line configuration, etc.) can be utilized based on the cloud indicator 304 (e.g., the cloud tag) to configure one or more of the branch router(s) 204 and/or one or more of the ICGW router(s) 202 to instruct the branch router(s) 204 and/or the ICGW router(s) 202 to route the cloud traffic from the branch router(s) 204, through the ICGW router(s) 202 and to the cloud(s) 214, via the CGW router(s) 206.

Advertisement of the cloud indicator 304 (e.g., the cloud tag) can be cease, stop, and/or be prevented, such as by the cloud(s) 214. Advertisement of the cloud indicator 304 (e.g., the cloud tag) can be prevented, and/or the ICGW 106 and/or one or more ICGW related paths can be withdrawn, so that the cloud traffic can be controlled by the branch router(s) 204 to be routed directly to the cloud(s) 214, via the public network 114. Advertisement of the cloud indicator 304 (e.g., the cloud tag) can be prevented, and/or the ICGW 106 and/or one or more ICGW related paths can be withdrawn, based on a failure being identified, the failure being associated with one or more devices (e.g., the ICGW 106 and/or one or more of the ICGW router(s) 202) and/or one or more paths (e.g., one or more paths between one or more of the ICGW router(s) 202 and the CGW 110) utilized to route traffic from the branch router(s) 204, through the ICGW router(s) 202 and to the cloud(s) 214, via the CGW router(s) 206.

In some examples, the priority(ies) of the transport gateway path and/or the non-transport gateway path can be removed, disregarded, and/or undefined based on advertisement of the cloud indicator 304 (e.g., the cloud tag) being prevented, and/or the ICGW 106 and/or one or more ICGW related paths being withdrawn. By removing and/or disregarding the priority(ies), and/or identifying the priority(ies) as being undefined, the branch router(s) 202 can route the cloud data through the non-transport gateway path, without utilizing priority(ies) of the transport gateway path and/or the non-transport gateway path. In those or other examples, the priority of the non-transport gateway path can be identified, generated, and/or modified as being greater than or equal to the priority of the transport gateway path based on advertisement of the cloud indicator 304 (e.g., the cloud tag) being prevented, and/or the ICGW 106 and/or one or more ICGW related paths being withdrawn.

One or more private network failure indicators 308 can be utilized to control the branch router(s) 204 to route the cloud traffic from the branch router(s) 204 and directly to the cloud(s) 214, via the public network 114. The private network failure indicator 308 being enabled and/or used alternatively or in addition to the cloud indicator 304 (e.g., the cloud tag) not being advertised to route the cloud traffic through the public network 114.

In some examples, one or more cloud indicators (e.g., the cloud indicator 304), one or more transport gateway indicators (e.g., the transport gateway indicator 306), and/or one or more private network failure indicator (e.g., the private network failure indicator 308) can be utilized to identify, generate, and/or modify one or more settings of the branch router(s) 204. The branch router setting(s) can be utilized by the branch router(s) 204 to identify how to route data (e.g., cloud data, branch-to-branch data, etc.) via the indirect path(s) or the direct path(s) according to techniques discussed herein.

Although the private network failure indicator 308, illustrated in FIG. 3 via a dotted line due to the private network failure indicator 308 being optional, can be used alternatively or in addition to the cloud indicator 304 (e.g., the cloud tag) not being advertised for the cloud traffic to route the cloud traffic from the branch router(s) 204 and directly to the cloud(s) 214, via the public network 114, as discussed above in the current disclosure, it is not limited as such. In some examples, for instance with no private network failure indicator 308 being identified, utilized, and/or generated, the cloud indicator 304 can be utilized to route the cloud traffic via the public network 114 according to the backup operation 118, based on the cloud indicator 304 due to the failure(s). The branch router(s) 204 can utilize the cloud indicator 304 to automatically route data via the public network 114 based on a selection (e.g., an OMP path selection associated with, representing, and/or based on the transport gateway indicator 306 (e.g., the transport gateway flag)) in the branch router(s) 204.

Although the private network failure indicator 308 being enabled, and/or the cloud indicator 304 (e.g., the cloud tag) not being advertised, can be utilized to route the cloud traffic from the branch router(s) 204 and directly to the cloud(s) 214, via the public network 114, as discussed above in the current disclosure, it is not limited as such. In some examples, the transport gateway flag can be disabled, alternatively or additionally to the private network failure indicator 308 being enabled and/or to the cloud indicator 304 (e.g., the cloud tag) not being advertised, to route the cloud traffic from the branch router(s) 204 and directly to the cloud(s) 214, via the public network 114.

Figure 4:
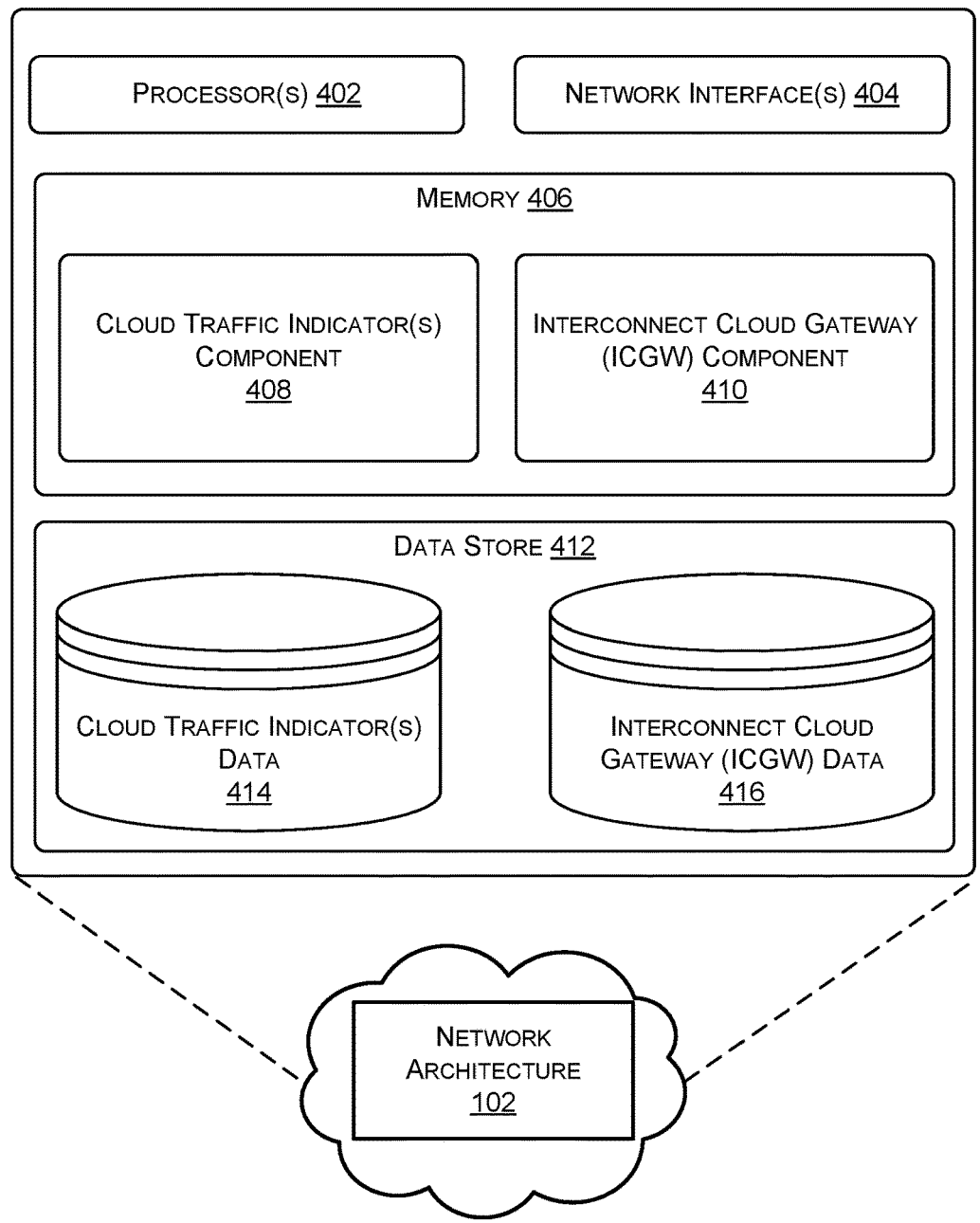
FIG. 4 illustrates a system-architecture diagram illustrating a configuration for a network architecture that can be utilized to implement aspects of the technologies disclosed herein.

FIG. 4 illustrates a system-architecture diagram illustrating a configuration for a network architecture that can be utilized to implement aspects of the technologies disclosed herein.

Generally, the network architecture 102 may include devices (e.g., one or more routers in the ICGW 106, as discussed above with reference to FIG. 1, and/or one or more other devices) housed or located in one or more data centers 104 that may be located at different physical locations. For instance, the network architecture 102 may be supported by networks of devices in a public cloud computing platform, a private/enterprise computing platform, and/or any combination thereof. The one or more data centers 104 may be physical facilities or buildings located across geographic areas that designated to store networked devices that are part of the network architecture 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the distributed application architecture 102 may not be located in explicitly defined data centers 104, but may be located in other locations or buildings.

The network architecture 102 may be accessible to user devices 108 over one or more networks, such as the Internet, one or more public networks, one or more private networks, and/or any combination thereof. The network architecture 102, and the network(s), may each respectively include one or more networks implemented by any viable communication technology, such as wired and/or wireless modalities and/or technologies. The network architecture 102 and the network(s) may each may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network architecture 102 may include devices, virtual resources, or other nodes that relay packets from one network segment to another by nodes in the computer network.

As illustrated, the network architecture 102 may include, or run on, one or more hardware processors 402 (processors), one or more devices, configured to execute one or more stored instructions. The processor(s) 402 may comprise one or more cores. Further, the network architecture 102 may include or be associated with (e.g., communicatively coupled to) one or more network interfaces 404 configured to provide communications with the user devices 108 and other devices, and/or other systems or devices in the network architecture 102 and/or remote from the network architecture 102. The network interface(s) 404 may include devices configured to couple to personal area networks (PANs), wired and wireless local area networks (LANs), wired and wireless wide area networks (WANs), and so forth. For example, the network interface(s) 404 may include devices compatible with any networking protocol.

The network architecture 102 may also include memory 406, such as computer-readable media, that stores various executable components (e.g., software-based components, firmware-based components, etc.). The memory 406 may generally store components to implement functionality described herein as being performed by the network architecture 102. The memory 406 may store a cloud traffic indicator(s) component 408 configured to manage cloud traffic indicator(s) (e.g., the cloud traffic indicator(s) 302) and/or an interconnect cloud gateway (ICGW) component 410 configured to manage one or more operations of the ICGW, as discussed throughout this disclosure.

The network architecture 102 may further include a data store 412, such as long-term storage, that stores cloud traffic indicator(s) data 414, such as data including, and related to, the cloud traffic indicator(s) 302, as discussed throughout the current disclosure. The data store 412 may store ICGW data 416 such as any data including, and related to, the ICGW 106 the ICGW router(s) 202, and/or any ICGW related paths, as discussed throughout the current disclosure.

Although the network architecture 102 including include the ICGW 106 may be included in the environment 100, as discussed above in the current disclosure, it is not limited as such. In some examples, the environment 100 may include, independently or in combination with the network architecture 102, one or more other network architectures including one or more cloud CGWs (e.g., the CGW 110 as discussed above with reference to FIG. 1), one or more network architectures including one or more of any other types of devices, such as the network device(s) (e.g., the ICGW router(s) 202, the branch router(s) 204, the CGW router(s) 206, etc., as discussed above with reference to FIG. 2), as discussed herein, and/or any combination thereof. In those or other examples, any of the network architecture(s) including any of the device(s) may include data and/or one or more components, in a similar way as for the network architecture 102 including the data 414 and 416 and the components 408 and 410, for operation of the device(s) to implement any of the techniques as discussed herein.

Figure 5:
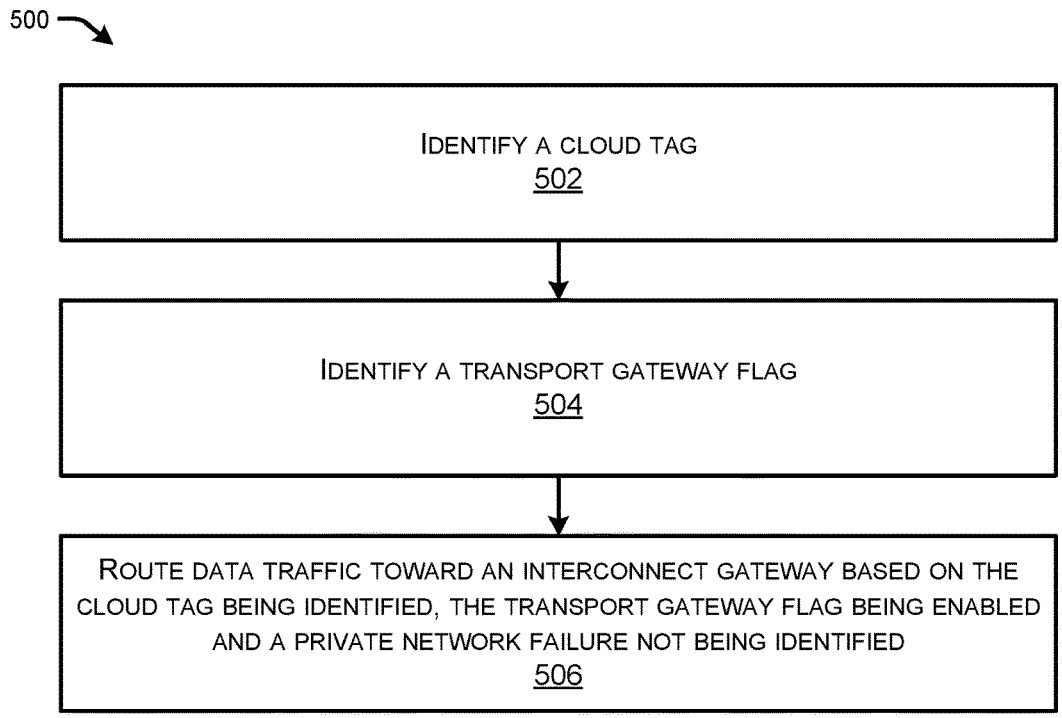
FIG. 5 illustrates a flow diagram of an example method for application acceleration on cloud networks.
Figure 6:
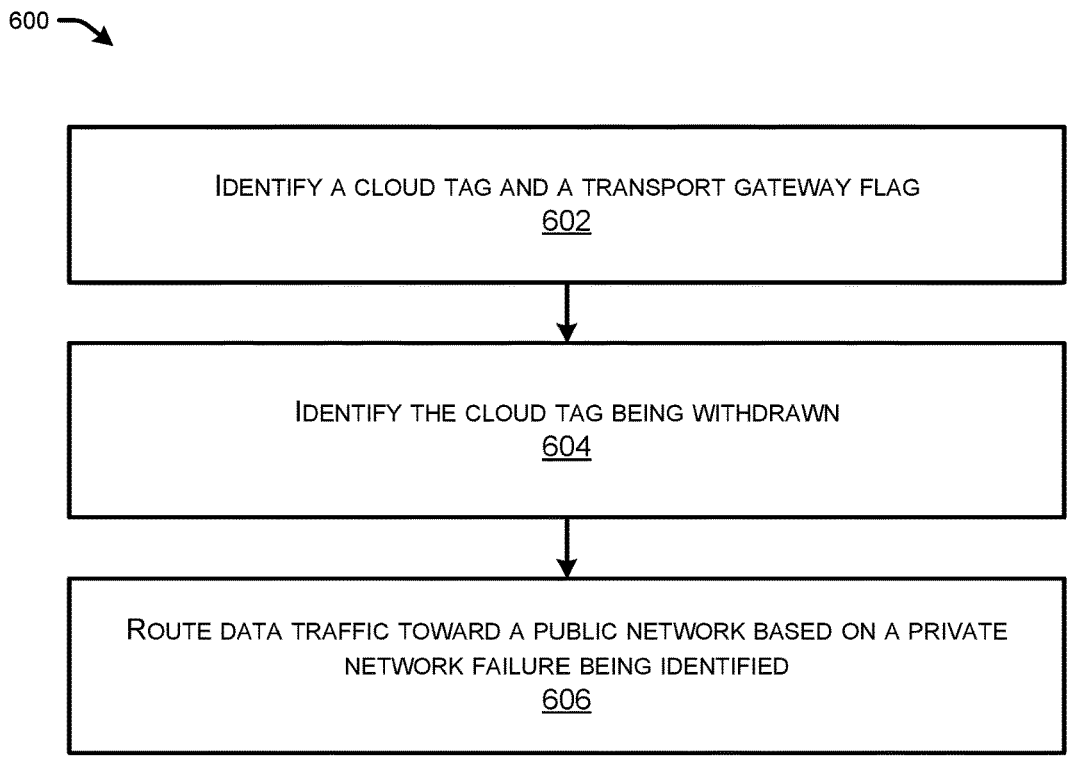
FIG. 6 illustrates a flow diagram of an example method for application acceleration on cloud networks.

FIGS. 5 and 6 illustrate flow diagrams of example methods 500 and 600 for application acceleration on cloud networks. The flow diagrams of the examples methods 500 and 600 illustrate aspects of the functions performed at least partly by one or more of the device(s) in the environment and network architecture(s) as described in FIGS. 1-4. The logical operations described herein with respect to FIGS. 5 and 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5 and 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more As illustrated in FIG. 5, the example method 500 may include steps, which may be performed, at least partly, by a branch router 204 in a network architecture 200. The branch router 204 may include one or more processors and one or more non-transitory computer-readable media storing computer-executable instructions that, when executed by the one or more processors, cause the one or more processors to perform the operations of method 500.

At 502, the branch router 204 can identify a cloud tag. A cloud indicator 304 (e.g., the cloud tag) can be identified by the branch router 204 as the cloud tag, which can be utilized to identify traffic as being cloud traffic. The cloud tag can be utilized to route the cloud bound traffic, including communicating cloud bound data to a cloud gateway (CGW) 110.

At 504, the branch router 204 can identify a transport gateway flag. A transport gateway indicator 306 (e.g., the transport gateway flag) being enabled can be utilized, based on identification of the cloud tag having been advertised, to identify, generate, and/or modify a transport gateway path as having a priority that is greater than or equal to a priority of a non-transport gateway path. The gateway flag being disabled, and/or the transport gateway path being withdrawn, can be utilized to identify the transport gateway path as not having a priority that is greater than or equal to a priority of the non-transport gateway path.

At 506, the branch router 204 can route data traffic toward an interconnect cloud gateway (ICGW) 106 based on the cloud tag being identified, the transport gateway flag being enabled, and a private network failure not being identified. The cloud data can be exchanged via the transport gateway path by utilizing the ICGW 106 as a transport gateway.

As illustrated in FIG. 6, the example method 600 may include steps, which may be performed, at least partly, by a branch router 204 in a network architecture 200. The branch router 204 may include one or more processors and one or more non-transitory computer-readable media storing computer-executable instructions that, when executed by the one or more processors, cause the one or more processors to perform the operations of method 500.

At 602, the branch router 204 can identify a cloud tag and a transport gateway flag. The transport gateway flag being disabled can be utilized to identify a transport gateway path as not having a priority that is greater than or equal to a priority of a non-transport gateway path.

At 604, the branch router 204 can identify the cloud tag not being advertised and/or the indirect path(s) having been withdrawn. Identifying the cloud tag as not being advertised can include an absence of identification of the cloud tag, identifying an absence of the cloud tag, identifying withdrawal of the cloud tag, and so on.

At 606, the branch router 204 can route data traffic toward a public network based on a private network failure being identified. The private network failure can include a failure of an interconnect cloud gateway (ICGW) 106, a failure of a device (e.g., a router) of the ICGW 106, a failure of a path between the ICGW 106 and a cloud gateway (CGW) 110, incomplete routing of cloud data (e.g., current cloud data and/or previous cloud data) between the ICGW 106 and the CGW 110, and so on.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A software defined wide-area network (SD-WAN) network device, the SD-WAN network device comprising:
    one or more processors; and
    one or more non-transitory computer-readable media storing computer-executable instructions that, when executed by the one or more processors, cause the one or more processors to perform operations comprising:
    receiving, at the SD-WAN network device, first route advertisements indicating first routes usable by the SD-WAN network device to directly reach virtual private clouds (VPCs) of a cloud system;
    receiving, at the SD-WAN network device, second route advertisements indicating second routes usable by the SD-WAN network device to indirectly reach the VPCs, wherein the second routes pass network traffic through a transport gateway prior to reaching a cloud gateway associated with the cloud system;
    receiving, at the SD-WAN network device, an indication that network traffic associated with a cloud tag is to be routed using the second routes to the cloud system via a transport gateway path through the SD-WAN, wherein the transport gateway path connects to the transport gateway running in the cloud system;
    enabling, on the SD-WAN network device, a setting that indicates network traffic that is tagged with the cloud tag is to be routed using the second routes and via the transport gateway path to the transport gateway of the cloud system, the transport gateway path having a higher priority than a non-transport gateway path;
    receiving particular network traffic that is tagged with the cloud tag;
    selecting, based at least in part on the network traffic being tagged with the cloud tag and the setting, one of the second routes corresponding to the transport gateway path for transmitting the particular network traffic; and
    transmitting the particular network traffic to the cloud system via the transport gateway path.

2. The SD-WAN network device of claim 1, wherein the cloud tag is received by the SD-WAN network device via an advertisement.

3. The SD-WAN network device of claim 1, wherein the particular network traffic is routed to the SD-WAN network device based at least in part on the setting being enabled that indicates network traffic that is tagged with the cloud tag is to be routed via the transport gateway path from among the transport gateway path and the non-transport gateway path.

4. The SD-WAN network device of claim 1, wherein a prefix of the SD-WAN network device includes the cloud tag utilized by the SD-WAN network device to route cloud bound data to an interconnect gateway.

5. The SD-WAN network device of claim 1, the operations further comprising:
disabling the cloud tag based on a failure of a path between a transport gateway and a cloud gateway.

6. The SD-WAN network device of claim 1, the operations further comprising:
disabling the cloud tag based on a failure of a transport gateway router.

7. The SD-WAN network device of claim 1, the operations further comprising:
disabling the cloud tag based on a failure of a transport gateway or a path between the transport gateway and the cloud gateway, the SD-WAN network device transmitting user data to the cloud gateway via a direct connection between the SD-WAN network device and the cloud gateway based on the cloud tag being disabled.

8. A system, comprising:
one or more processors; and
one or more non-transitory computer-readable media storing computer-executable instructions that, when executed by the one or more processors, cause the one or more processors to perform operations comprising:
receiving, at a network device, first route advertisements indicating first routes usable by the network device to directly reach virtual private clouds (VPCs) of a cloud system;
receiving, at the network device, second route advertisements indicating second routes usable by the network device to indirectly reach the VPCs, wherein the second routes pass network traffic through a transport gateway prior to reaching a cloud gateway associated with the cloud system;
receiving an indication that network traffic associated with a cloud tagis to be routed using the second routes to the cloud system via a transport gateway path through a Software-Defined Wide Area Network (SD-WAN), wherein the transport gateway path connects to the transport gateway running in the cloud system;
enabling a setting that indicates network traffic that is tagged with the cloud tag is to be routed using the second routes and via the transport gateway path to the transport gateway of the cloud system, the transport gateway path having a higher priority than a non-transport gateway path;
receiving particular network traffic that is tagged with the cloud tag;
selecting, based at least in part on the network traffic being tagged with the cloud tag and the setting, one of the second routes corresponding to the transport gateway path for transmitting the particular network traffic; and
transmitting the particular network traffic to the cloud system via the transport gateway path.

9. A method performed at least partly by a network device, the method comprising:
receiving, at the network device, first route advertisements indicating first routes usable by the network device to directly reach virtual private clouds (VPCs) of a cloud system;
receiving, at the network device, second route advertisements indicating second routes usable by the network device to indirectly reach the VPCs, wherein the second routes pass network traffic through a transport gateway prior to reaching a cloud gateway associated with the cloud system;
receiving an indication that network traffic associated with a cloud tag is to routed using the second routes to the cloud system via a transport gateway path through a Software-Defined Wide Area Network (SD-WAN), wherein the transport gateway path connects to the transport gateway running in the cloud system;
enabling a setting that indicates network traffic that is tagged with the cloud tag is to be routed using the second routes and via the transport gateway path to the transport gateway of the cloud system, the transport gateway path having a higher priority than a non-transport gateway path;
receiving particular network traffic that is tagged with the cloud tag;
selecting, based at least in part on the network traffic being tagged with the cloud tag and the setting, one of the second routes corresponding to the transport gateway path for transmitting the particular network traffic; and
transmitting the particular network traffic to the cloud system via the transport gateway path.

10. The method of claim 9, wherein the cloud tag is received by the network device via an advertisement.

11. The method of claim 10, wherein the particular network traffic is routed to the network device based at least in part on the setting being enabled that indicates network traffic that is tagged with the cloud tag is to be routed via the transport gateway path from among the transport gateway path and the non-transport gateway path.

12. The method of claim 9, wherein a prefix of the network device includes the cloud tag utilized by the network device to route cloud bound data to an interconnect gateway.

13. The method of claim 9, further comprising:
disabling the cloud tag based on a failure of a path between a transport gateway and a cloud gateway.

14. The method of claim 9, further comprising:
disabling the cloud tag based on a failure of a transport gateway or a path between the transport gateway and the cloud gateway, the network device transmitting user data to the cloud gateway via a direct connection between the network device and the cloud gateway based on the cloud tag being disabled.

15. The method of claim 9, wherein the cloud tag is sent to the network device, by an interconnect gateway router and via a first advertisement.

16. The SD-WAN network device of claim 1, the system of claim 8, the operations further comprising:
determining that the second routes usable to indirectly reach the VPCs through the transport gateway have either been withdrawn or were not advertised; and
determining to advertise the second routes in the second route advertisements.

17. The system of claim 8, wherein the cloud tag is received by the network device via an advertisement.

18. The system of claim 8, wherein the particular network traffic is routed to the network device based at least in part on the setting being enabled that indicates network traffic that is tagged with the cloud tag is to be routed via the transport gateway path from among the transport gateway path and the non-transport gateway path.

19. The system of claim 8, wherein a prefix of the network device includes the cloud tag utilized by the network device to route cloud bound data to an interconnect gateway.

20. The system of claim 8, the operations further comprising disabling the cloud tag based on a failure of a path between a transport gateway and a cloud gateway.

21. The system of claim 8, the operations further comprising disabling the cloud tag based on a failure of a transport gateway or a path between the transport gateway and the cloud gateway, the network device transmitting user data to the cloud gateway via a direct connection between the network device and the cloud gateway based on the cloud tag being disabled.

* * * * *